United States Patent
Chopra et al.

(10) Patent No.: US 12,229,429 B2
(45) Date of Patent: Feb. 18, 2025

(54) STORAGE ARRAY AWARE DYNAMIC SLICING OF A FILE SYSTEM

(71) Applicant: Dell Products L.P., Round Rock, TX (US)

(72) Inventors: Shelesh Chopra, Bangalore (IN); Upanshu Singhal, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 307 days.

(21) Appl. No.: 18/082,995

(22) Filed: Dec. 16, 2022

(65) Prior Publication Data
US 2024/0201887 A1 Jun. 20, 2024

(51) Int. Cl.
G06F 3/00 (2006.01)
G06F 3/06 (2006.01)
G06F 11/00 (2006.01)
G06F 11/14 (2006.01)

(52) U.S. Cl.
CPC ............ *G06F 3/065* (2013.01); *G06F 3/0604* (2013.01); *G06F 3/067* (2013.01); *G06F 11/1446* (2013.01); *G06F 11/1458* (2013.01); *G06F 11/1469* (2013.01)

(58) Field of Classification Search
CPC .. G06F 3/065; G06F 11/1446; G06F 11/1458; G06F 11/1469
See application file for complete search history.

(56) References Cited

U.S. PATENT DOCUMENTS

2019/0243547 A1* 8/2019 Duggal ................. G06F 3/0619

* cited by examiner

*Primary Examiner* — Reginald G Bragdon
*Assistant Examiner* — Michael L Westbrook
(74) *Attorney, Agent, or Firm* — Aly Z. Dossa; Chamberlain, Hrdlicka, White, Williams & Aughtry

(57) ABSTRACT

Embodiments of the invention relate to methods and systems for efficiently performing one or more backups of assets stored on a shared storage. In one or more embodiments, the assets are sliced into a plurality of slices and the size of the slices is determined based on a maximum recommended number of connections that can be used and either a previous backups number of connections used, or the total number of connections currently used. The recommended number of connections to use is also calculated based on system telemetry. By changing the size of the slices, one or more embodiments of the invention may ensure that the backup is performed as efficiently as possible. This may result in better utilization of system and network resources as well as a better backup and recovery performance.

20 Claims, 5 Drawing Sheets

US 12,229,429 B2

STORAGE ARRAY AWARE DYNAMIC SLICING OF A FILE SYSTEM

BACKGROUND

As people increasingly rely on computing systems and devices to perform a plethora of tasks; the systems have become increasingly complex, and the opportunities for failure and/or loss of important data have also increased. In order to avoid loss of important data, backups are performed on the computing systems and devices, so that when device failures or loss of data for other reasons occur, the lost data may be restored. However, traditional methods of backing up and restoring data are inefficient, slow, and use much of the available network bandwidth.

SUMMARY

In general, certain embodiments described herein relate to a method for performing an incremental backup of a shared storage. The method begins by initiating the incremental backup and then retrieving current system telemetry for the shared storage. Using the current system telemetry, the maximum number of connections per node the shared storage can support is then determined. The method then calculates a recommended number of connections to use for performing the incremental backup and a new slice size. The new slice size is determined by increasing or decreasing a previous slice size based on a comparison between an amount of active connection and a maximum number of connections per node that the shared storage can support. Once the new slice size and recommended number of connections is determined, the incremental backup is performed using the recommended number of connections and slices having the new slice size.

In general, certain embodiments described herein relate to a non-transitory computer readable medium comprising computer readable program code, which when executed by a computer processor enables the computer processor to perform a method for performing an incremental backup of a shared storage. The method begins by initiating the incremental backup and then retrieving current system telemetry for the shared storage. Using the current system telemetry, the maximum number of connections per node the shared storage can support is then determined. The method then calculates a recommended number of connections to use for performing the incremental backup and a new slice size. The new slice size is determined by increasing or decreasing a previous slice size based on a comparison between an amount of active connection and a maximum number of connections per node that the shared storage can support. Once the new slice size and recommended number of connections is determined, the incremental backup is performed using the recommended number of connections and slices having the new slice size.

In general, certain embodiments described herein relate to a system comprising: a processor and a memory. The memory includes instructions, which when executed by the processor, perform a method for performing an incremental backup of a shared storage. The method begins by initiating the incremental backup and then retrieving current system telemetry for the shared storage. Using the current system telemetry, a maximum number of connections per node the shared storage can support is then determined. The method then calculates a recommended number of connections to use for performing the incremental backup and a new slice size. The new slice size is determined by increasing or decreasing a previous slice size based on a comparison between an amount of active connection and a maximum number of connections per node that the shared storage can support. Once the new slice size and recommended number of connections is determined, the incremental backup is performed using the recommended number of connections and slices having the new slice size.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
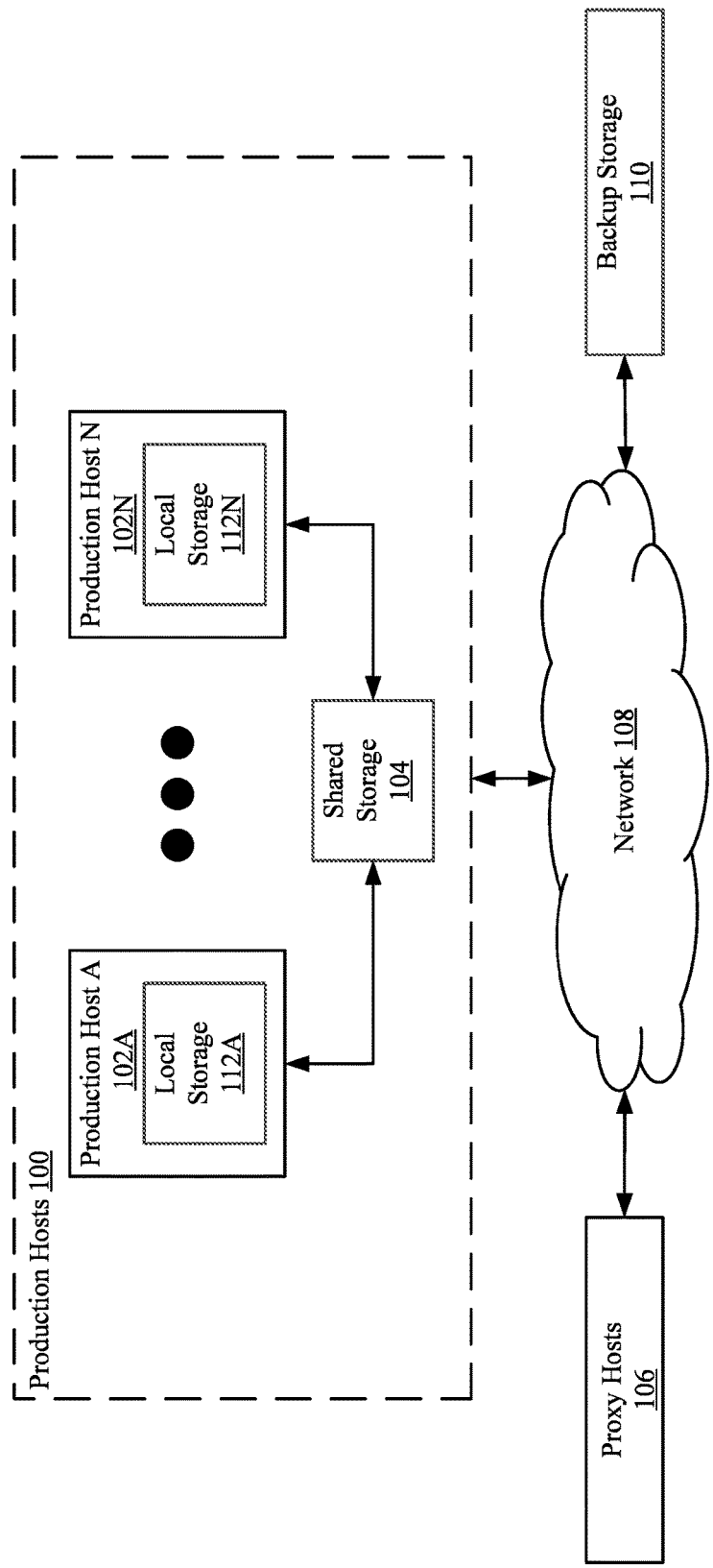
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connections (e.g., wired directly between two devices or components) or indirect connections (e.g., wired and/or wireless connections between any number of devices or components connecting the operatively connected devices). Thus, any path through which information may travel may be considered an operative connection.

In many traditional data protection and management solutions for client/server architectures, backups are inefficiently performed. Clients send a request for backing up desired assets such as files, folder, and/or data stored in a host or in other locations such as shared storage. When the request is received, the host and/or the client crawls the files and/or folders over the network to get a list of the assets associated with the backup request. Once the assets are determined, they are sliced to form standard size slices which are assigned to a plurality of network streams without consideration of the configuration and current usage of the system.

Currently, there is no intelligence for determining an ideal size of the slices nor the number of streams/connections to use for streaming each slice when performing a backup from a shared storage device such as network attached storage (NAS). Assets such as files and folders, are typically sliced up into standard size slices of equal size such as 200 GB and placed using a predetermined number of parallel streams sent through a predetermined number of connections to a backup storage device. However, this does not consider the amount of compute resources that are (or need) to be used by other processes (such as, but not limited to, applications and/or other backups). Further, the standard size slice may cause the backup to take longer than necessary, as the assets are inefficiently sliced and transmitted by potentially an insufficient number of connections.

In accordance with one or more embodiments of the invention, by analyzing the current system telemetry associated with a shared storage device and backup storage, as well as analyzing the performance of one or more previous backups and/or backups being currently performed, the invention may alter the size of the slices to more efficiently use the number of connections that are available for use in performing the backups. The size of the slices and number of connections/containers is adjusted to maximize the speed and performance of the backup without significantly reducing the ability of the shared storage to perform other tasks and/or service requests from other processes and backups.

The invention, in accordance with one or more embodiments, increases the size of the slices when the number of parallel streams and/or connections currently being used (for example, by other backups) is greater than a predetermined percentage of a recommended maximum number of connections. Otherwise, the invention decreases the size of the slices. The invention also determines a recommend number of connections to use based on the shared storage's maximum connections per node, which in one or more embodiments, is obtained from the share storage's system telemetry, the number of nodes and the predetermined percentage of connections to use. These and other aspects of the one or more embodiments of the invention result in better utilization of system and network resources as well as a better backup and recovery performance.

The following describes various embodiments of the invention.

FIG. 1A shows a diagram of a system in accordance with one or more embodiments of the invention. The system includes a group of production hosts (100). The group may include a plurality of production hosts (102A-102N) as well as any shared storage (104). The system may include any number of production hosts (e.g., 102A-102N) and while shown as one group of two production hosts (102A and 102N), there may be any number of production hosts and the production hosts may belong to any number of groups or being interrelated in any manner without departing from the invention. For example, the system may include six production hosts configured as two groups (not shown) that communicate through a network (108).

The system also includes one or more proxy hosts which may facilitate performing various processes with the shared storage (104), one or more of the production hosts (e.g., 102A-102N), and/or the backup storage (e.g., 110). The system may also include backup storage (110) for storing any number of backups. The proxy hosts (106), backup storage (110) and production hosts (100) may be part of the same device, including the shared storage, the shared storage (e.g., 104). Alternatively, the proxy hosts (106) and backup storage (110) may be hosted on separate standalone components and/or systems. The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the production hosts (100) interact via a network (108) with one or more proxy hosts (e.g., 106). The proxy hosts (106) may be hosted on separate computing systems or part of one or more of the production hosts (e.g., 102A-102N), the shared storage (e.g., 104) and/or the backup storage (e.g., 110). In one or more embodiments of the invention the proxy hosts (106), through one or more connections, retrieves one or more selected assets from the shared storage (104), slices then, and stores the resulting slices on the backup storage (110) as described in more detail below. Alternatively, or in addition to, in one or more embodiments of the invention, proxy hosts (106) may include or be part of a backup agent (not shown), another component in the system (not shown), and/or a data protection manager. Other configurations of the proxy hosts (106) and the production hosts (100) may be utilized without departing from the invention.

In one or more embodiments of the invention, the proxy host (106) may generate and provide to the backup storage device (110) backup data in the form of slices, backup metadata, as well as any other data that is produced by the proxy host (106) in the process of performing a backup based on backup policies implemented by the proxy hosts (106). The backup policies may specify a schedule in which assets associated with the production hosts (e.g., 102A-102N) are to be backed up.

The proxy hosts (106) may be triggered to generate a backup. The backups may take the form of either a full or incremental backup as well as any other type of backup. Backup data along with backup metadata is produced and then transmitted to the backup storage device (110) in response to a backup policy. Alternatively, backup, and backup metadata may be generated by the proxy hosts (106) and provided to the backup storage device (110) in response to a backup request triggered by a client (not-shown), a backup agent (not shown) or user of the system. The method of backing up an asset comprising of files and folders is described in more detail below with regards to the methods shown in FIGS. 2 and 3.

In one or more embodiments of the invention, the proxy hosts (106) store backup data on backup storage (e.g., 110). The backup storage (110) may store data and/or files such as backup data, metadata, as well as definitions rules, procedures, and other pertinent information for performing backups of the production hosts (e.g., 102A-102N). In one or more embodiments of the invention, the backup storage stores the backup data in the form of slices in a plurality of backup containers. The backup storage (110) may include one or more processors, memory (e.g., random access memory), and persistent storage (e.g., disk drives, solid state drives, etc.). In one or more embodiments of the invention, the backup storage (110), as well as the proxy hosts (106), may also, or alternatively, comprise of off-site storage including but not limited to, cloud base storage, and long-term storage such as tape drives, depending on the particular needs of the user and/or the system.

In one or more embodiments of the invention, the proxy hosts (106) may also restore the backup metadata and backup data stored in the backup storage (110). In one or more embodiments of the invention, a separate restoration agent (not shown), other proxy host (not shown), or equivalent components of the system such as a backup agent (not shown), perform restorations. When the proxy host (106) or other equivalent component of the system, receives a request for a restoration of a backup, the proxy hosts (106), or equivalent component, retrieves the metadata and data stored in the backup storage (110) and restores the data to its original location in the production hosts (e.g., 102A-102N). Alternatively, in one or more embodiments of the invention, the data in the backup may be restored to a file system located in a different production host than where it was originally restored as directed by a user, administrator, or other party that requested the restoration.

In one or more embodiments of the invention, the proxy hosts (106) are implemented by a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the proxy host (106) described throughout this application.

Figure 4:
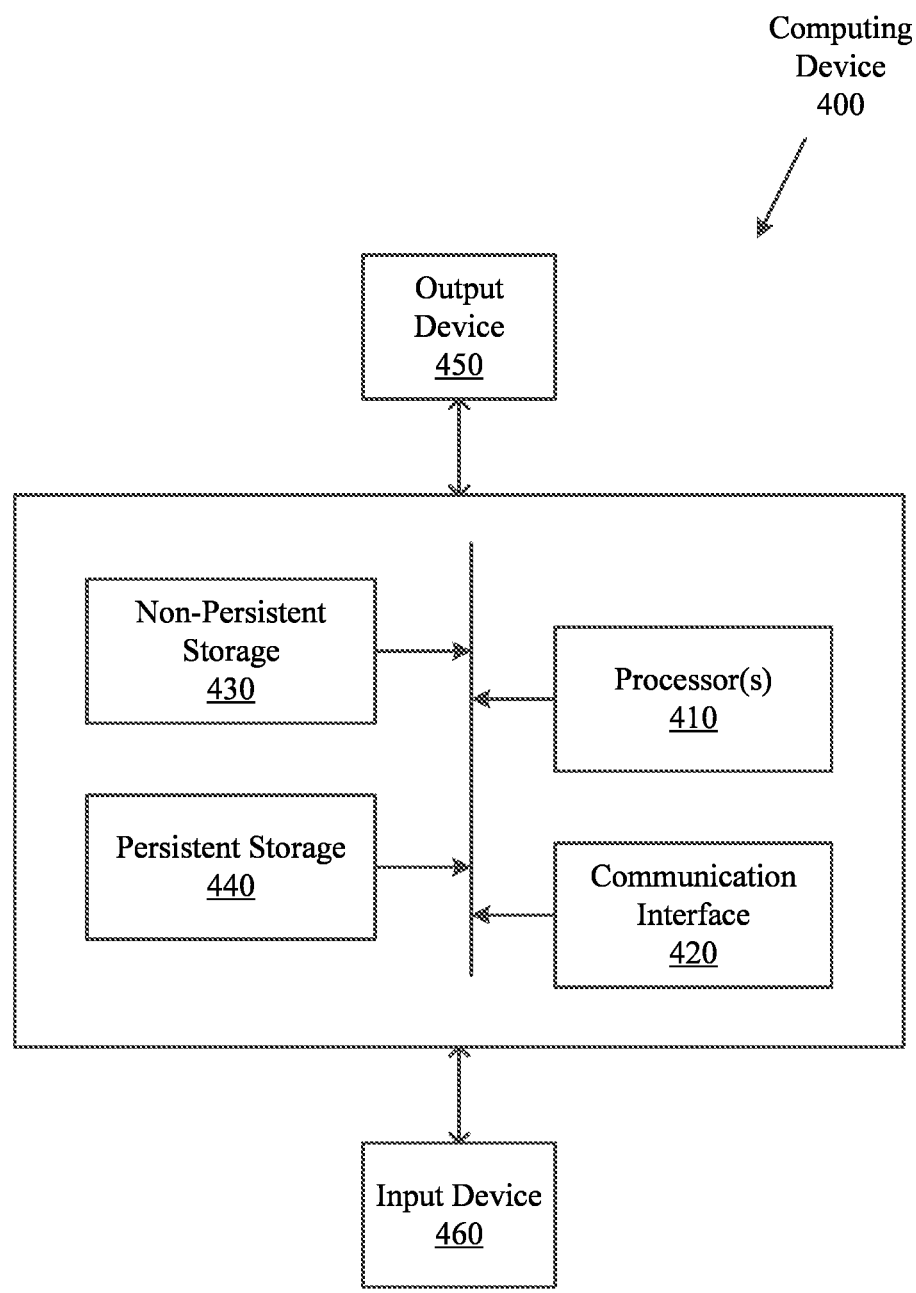
FIG. 4 shows a diagram of a computing device in accordance with one or more embodiments of the invention.

In one or more embodiments of the invention, the proxy hosts (106) are implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the proxy hosts (e.g., 106) described throughout this application.

In one or more embodiments of the invention, the proxy hosts (106) are implemented as computer instructions, e.g., computer code, stored in a persistent storage that when executed by a processor of the production hosts (e.g., 102A-102N) causes the production hosts (e.g., 102A-102N) to provide the functionality of the proxy hosts (e.g., 106) described throughout this application. Alternatively, in one or more embodiments of the invention, the proxy hosts (106) may be implemented by the shared storage (e.g., 104), one or more production hosts (e.g., 102A-102N), a group manager (not shown), a client (not shown), or other component of the system, which may provide the functionality of the proxy hosts (e.g., 106) described throughout this application.

In one or more embodiments of the invention, the production hosts (100), shared storage (104), the proxy hosts (106), and backup storage (110) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the production hosts (e.g., 100) to communicate with other production hosts and other external computing devices such as, but not limited to, one or more proxy hosts (e.g., 106), a client (not shown), shared storage (e.g., 104) and/or other components such as backup agent (not shown). The production hosts (e.g., 100) may also communicate with each other through a network. The network may be a high-speed internal network and/or include part of an external network (e.g., 108). The production hosts (e.g., 100), and shared storage (e.g., 104) communicate with each other over the internal network and in one or more embodiments of the invention provide fallback functionality.

A network (e.g., 108) may refer to an entire network or any portion thereof (e.g., a logical portion of the devices within a topology of devices). A network (e.g., 108) may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1A, the network (108) may include any number of devices within any components (e.g., 100, 102A-102N, 104, 106, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown). A network device may also include one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multi-layer switch, a fibre channel device, an InfiniBand® device, etc. A network device is not limited to the aforementioned specific examples.

In one or more embodiments of the invention, the network (e.g., 108) utilizes one or more connections and/or streams for communicating (or transferring) information between two components such as between the shared storage (e.g., 104) and the proxy hosts (e.g., 106). Any particular communication may use one or more connections which can each move one or more streams of information/data assigned to it, with a maximum number of connections and streams being preconfigured as a consequence of the network's design as well as the devices (such as, in one or more embodiments of the invention, the number of nodes available in the shared storage (104)). Each connection and/or stream has a maximum throughput, which is the maximum amount of data that may be sent between two components during a period of time, given network conditions. The total number of streams and connections that may be used is dependent on the capabilities of the network and components as well as the total throughput. Each stream utilizes part of the total bandwidth of each connection, thus when more streams are applied, each stream has a lower total throughput.

One or more embodiments of the invention includes a plurality of production hosts (e.g., 102A-102N) which include the functionality to obtain data protection services from the proxy hosts (e.g., 106), separate backup agents (not shown) and/or a data protection manager (not shown). While shown as including only three production hosts (e.g., 102A-102N), the production hosts (e.g., 100) may include more or less production hosts without departing from the invention. For example, a group of production hosts (e.g., 100) may include at least sixteen production hosts, at least fifty production hosts, or at least a hundred production hosts without departing from the invention.

Each host (e.g., 102A-102N) includes local storage (e.g., 112A-112N) for storing assets, such as files and folders, which may be made available to other hosts or requesting target devices such as the proxy hosts (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may communicate or utilize off-site storage including, but not limited to, shared storage (104), cloud base storage, and long-term storage such as tape drives, depending on the particular needs of the user and/or the system.

The production hosts (100) may utilize shared storage (104) such as network attached storage (NAS) or dynamic network attached storage (DNAS), which is active with each of the production hosts (e.g., 102A-102N). Other types of shared storage may also, or alternatively, be included such as active-passive storage and other kinds of shared storage. The shared storage may communicate with each of the production hosts by high-speed network or other dedicated communication mechanisms and as described in more detail below the shared storage (e.g., 104) may communicate with the backup storage (e.g., 110) via a plurality of connections and streams. In one or more embodiments of the invention the shared storage may be used instead of the local storage (e.g., 112A-112N) or may be used in concert with the local storage (e.g., 112A-112N). The share storage (104) may also be used as the backup storage (e.g., 110).

The local storages (e.g., 112A-112N) and/or shared storage (e.g., 104) may include any number of storage volumes without departing from the invention. The storage volumes may be physical storage devices and/or logical storage devices. The physical storage devices may include any combination of hard disk drives, solid state disk drives, tape drives, and/or any other physical storage mediums for data.

The logical storage devices may utilize any quantity of hardware storage resources of any number of computing devices for storing data. For example, the local and shared storages (e.g., 112A-112N, 104) may utilize portions of any combination of hard disk drives, solid state disk drives, tape drives, and/or any other physical storage mediums for any number of computing devices.

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients, not shown). The computer implemented services may include, for example, database services, electronic mail services, data processing services, etc. The computer implemented services may include other and/or additional types of services without departing from the invention.

During the performance of the services described above, data may be generated and/or otherwise may be obtained. The various data storage volumes (e.g., 112A-112N and 104) may be used during the performance of the services described above, by performing data storage services including storing, modifying, obtaining, and/or deleting data. The data storage services may include other additional services without departing from the invention.

The data generated and stored on the local storages (e.g., 112A-112N) and shared storage (e.g., 104) by the production hosts (e.g., 102A-102N) may be valuable to users of the system, and therefore may be protected by the proxy hosts (e.g., 106). The production hosts (e.g., 102A-102N), alternatively or in addition to the proxy hosts (e.g., 106), may provide backup storage services and include backup storage on the local storage (e.g., 112A-112N) and/or shared storage (e.g., 104). The backup storage services may include storing backups of data stored on the shared storages for restoration purposes. The backup storage services may include other and/or additional services without departing from the invention.

The production hosts (100) may include a primary production host (e.g., 102A) and secondary production hosts (e.g., 102N). The specific configuration of which production host is the primary production host and which production host is the secondary production host may be preconfigured or may be automatically managed by a system manager (not shown). The production hosts (100) may include any number of secondary production hosts without departing from the invention. Alternatively, all production hosts (e.g., 102A-102N) may be secondary production hosts with another component of the system or external computing component performing the additional tasks of the primary host.

In one or more embodiments of the invention, the production hosts (e.g., 102A-102N) are implemented as computing devices (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (100) described throughout this application.

In one or more embodiments of the invention, the production hosts (100) are implemented as logical devices. The logical devices may utilize the computing resources of any number of computing devices, and thereby provide the functionality of the production hosts (100) described throughout this application.

Figure 1B:
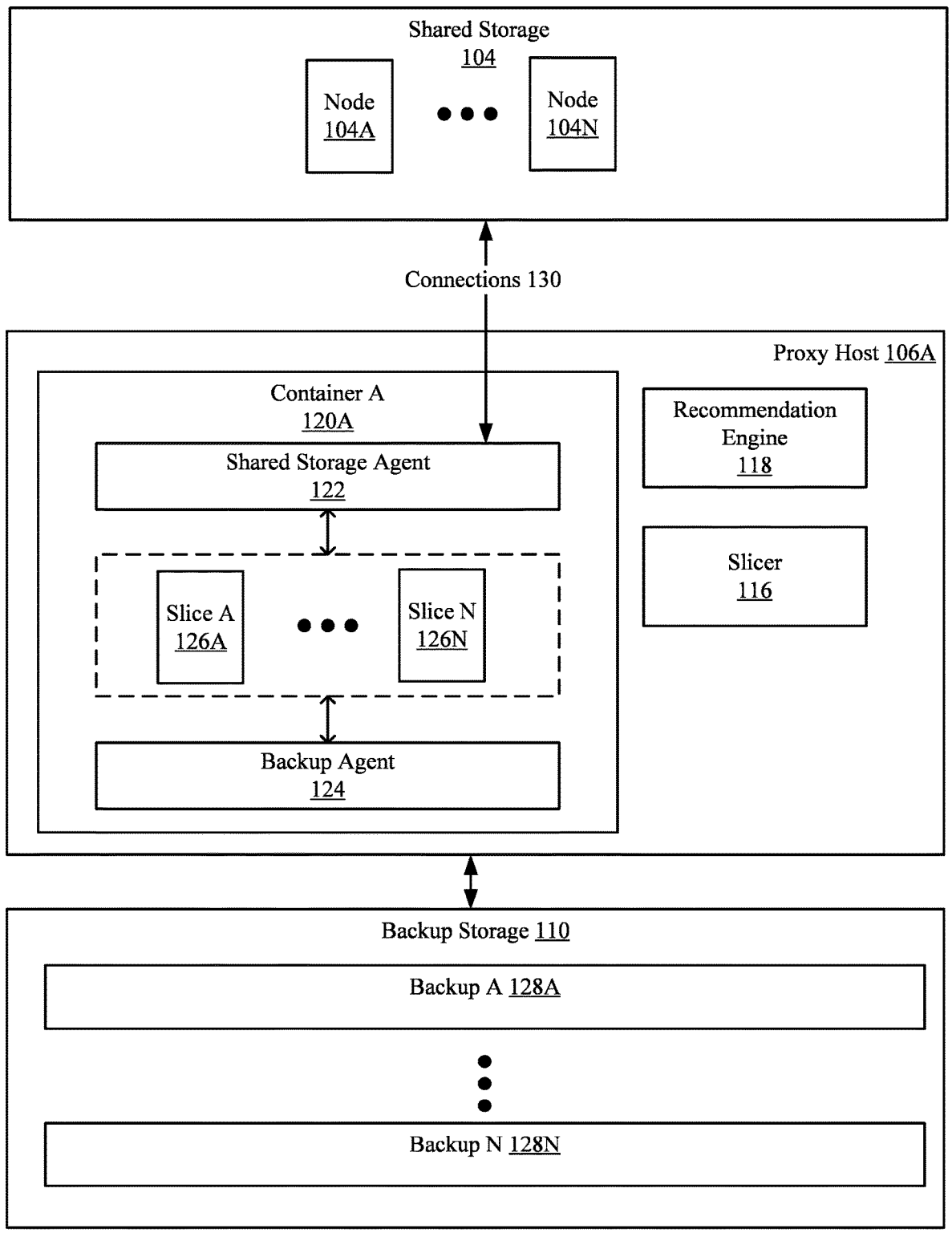
FIG. 1B shows a detailed diagram of a system for backing up one or more assets stored on a storage array in accordance with one or more embodiments of the invention.

Turning now to FIG. 1B, FIG. 1B shows a diagram of specific components utilized in performing a backup of at least one user defined logical asset located on one or more nodes (104A-104N) of a shared storage device (104) by a proxy host (e.g., 106A) in accordance with one or more embodiments of the invention. The proxy hosts (e.g., 106A) utilizes one or more connections (130) to transfer data from the shared storage (104), slice the data, and transmit it to backup storage (110) for storage. Each component illustrated in FIG. 1B is discussed below.

The shared storage (104) includes data, which is stored on one or more nodes (104A-104N). In one or more embodiments of the invention, the shared storage (104) takes the form of a NAS array, however, the shared storage (104) may take any other form of shared storage without departing from the invention. The shared storage (e.g., 104) may include storage devices (not shown) for storing data (e.g., 114). The storage devices may be physical storage devices and/or logical storage devices. The physical storage devices may include any combination of hard disk drives, solid state disk drives, tape drives, and/or any other physical storage mediums for the storage of data. The backup storage devices may utilize any quantity of hardware storage resources of any number of computing devices for storing data. For example, the shared storage (104) may utilize portions of any combination of hard disk drives, solid state disk drives, tape drives, and/or any other physical storage medium of any number of computing devices.

In one or more embodiments of the invention, the one or more nodes (e.g., 104A-104N) stores a plurality of assets (not shown) in the form of one or more file systems and corresponding files and folders. Alternatively, the assets may be stored in a variety of forms and may not be organized as one or more file systems. In one or more embodiments of the invention the shared storage (e.g., 104) may store data measured in bytes. The storage capacity may range from a few GB (Gigabytes) to PB (Petabytes) or larger, which is accessed by the plurality of nodes (e.g., 104A-104N) to provide data to the production hosts (e.g., 100, FIG. 1A) and/or one or more proxy hosts (e.g., 106A). The size of the shared storage (e.g., 104) is only limited by the amount of storage needed, system capabilities, and/or system costs. The plurality of assets may each range from a size of a few bytes to several hundred TB (Terabytes) or more. The invention is not limited by the size of the plurality of assets and/or the size of shared storage (e.g., 104).

Periodically, according to data protection policies or user requests, one or more backups are performed. This may be initiated by one or more components of the proxy host (106A) such as a backup agent (124), a data protection manager (not shown) or by input from a user, administrator, manufacture, or other concerned party. The backup request may be for one or more selected assets which may comprise all the data stored on the shared storage (104), a specific file system, or select files and folders stored in the shared storage (104). The backup request may be for an initial full backup, a subsequent full backup, a subsequent partial backup, a synthetic backup, or any other type of backup.

As described in more detail below with regards to the methods shown in FIGS. 2 and 3, when one or more backups are initiated, the one or more proxy hosts (e.g., 106A), establishes one or more connections (e.g., 130) with the shared storage (e.g., 104), and using one or more containers (e.g., 120A), slices the asset into one or more slices (e.g., 126A-126N) and stores the slices in one or more backups (128A-128N) located on backup storage (110).

In one or more embodiments, a recommendation engine (118) receives the backup request. Based on slicing parameters and other parameters for the backup, the recommendation engine (118) and/or related components such as, but not limited to, the slicer (e.g., 116) and containers (e.g., 120A), establishes the number of connections and configures the slices for performing the backup(s). Backup parameters are read by the recommendation engine (e.g., 118) or another component from a configuration file, user or administrator input, or other sources. The configuration file or other form of slicing parameters may be stored on storage associated with the proxy host (106A), or in the shared storage (e.g., 104), or it may be provided by a requesting device, such as a client device, (not shown) when it requests the backup to be performed.

In one or more embodiments of the invention, the recommendation engine determines a recommended number of connections to use to perform the backup(s). As described in more detail below, with regards to the method shown in FIG. 2, the recommendation engine or a related component retrieves from telemetry and/or determines the number of nodes the share storage (104) has available for performing a backup as well as the maximum number of connections each node may support.

The recommendation engine (118) or a related component, in one or more embodiments of the invention, multiplies the maximum connections per node obtained from the telemetry for the shared storage (e.g., 104) by a predetermined percentage. The predetermined percentage may be obtained from a user, administrator, or other concerned party and is an indication of the maximum percentage of resources that the user or other party wishes to be used for the purpose of performing a backup. Alternatively, the percentage may be determined by analyzing system logs or one or more previous backups' metadata to determine, based on type of backup being performed, the size of the backup and/or when the backup is being performed, an ideal percent of system resources to be reserved for the use of performing the backup. In another embodiment, the percentage made be determined based on the predicted usage of the shared storage when the backup is to be performed. Other mechanisms for obtaining the percentage may be used without departing from the invention including presenting the percentage at the time the system is initialized and/or manufactured to be 50%. Other percentages between 0 and 100% may be used without departing from the invention.

Once the recommended number of connections are calculated by the recommendation engine or other component, one or more proxy hosts (e.g., 106A) may establish the recommend number of connections (e.g., 130) between each node of the shared storage and a corresponding number of containers. In one or more embodiments of the invention, each connection (e.g., 130) carries eight parallel streams of data, however, more, or less parallel streams per connection (e.g., 130) may be used without departing form the invention.

Once the connections are established, the slicer (e.g., 116) and/or the recommendation engine (e.g., 118) then determines a new slice size for slicing the assets on the one or more nodes (e.g., 104A-104N) on the shared storage (e.g., 104). The method of determining a new slice size is described in more detail below with regards to the method shown in FIG. 3.

The new slice size, in one or more embodiments of the invention, is determined by analyzing the metadata of a previous backup, such as, but not limited to the initial full backup, or any incremental backups, to determine a previous slice size. In one or more embodiments of the invention, alternatively, a standard size slice is used for the previous slice size. In one or more embodiments of the invention, the standard size slice is 200 GB, however, the exact value of the standard size slice is dependent on the size of the shared storage (104), network configuration (108) and other factors and may be determined by a user, administrator, manufacturer, or other concerned party when the shared storage (104), proxy host (106A) or other component of the system, which may include the entire system, are initialized or manufactured.

The recommendation engine (e.g., 118) and/or the slicer (e.g., 116) then compares the current number of active connections with the recommended maximum number of connections to determine if the slice size should be increased or if the slice size should be decreased. If the number of active connections is less than or equal to the recommended maximum connections, the size of each slice is decreased by a predetermined percentage, if however, the number active connections is greater than the recommended connections, the size of each slice is increased by the predetermined percentage. In one or more embodiments of the invention, the predetermined percentage is 50%, however the predetermined percentage may be more or less depending on the preferences of a user, administrator, and/or other concerned party and/or based on system configuration.

In one or more other embodiments of the invention, the assets are sliced by the slicer (116) or another similar component such as the shared storage agent (122) and/or the individual nodes (e.g., 104A-104N) using the new size of the slices. In one or more embodiments of the invention, the assets are retrieved from the nodes (e.g., 104A-104N) may be assigned in such a way that each slice (e.g., 122A-122N) has an equal size within a predetermined tolerance from the determined size. This tolerance may be plus or minus a percentage that is specified in the slicing parameters and/or specified by a client, a user, or an administrator at the time that the asset is requested. Some examples of a tolerance are ≤±1%, ±5%, or ±10%. Other percentages and/or ranges may be used without departing from the invention.

Once the new size of the slices is determined, the slices (e.g., 126A-126N) are then streamed by the containers (e.g., 120A) from the plurality of nodes (e.g., 104A-104N), using a plurality of connections (e.g., 130). In one or more embodiments of the invention, each container uses one connection (e.g., 130), which can carry eight parallel streams (each of which is able to perform concurrent I/O on the shared storage). The connections are established, and the data is moved by the shared storage agent (122) or another similar component. The shared storage agent (122), while shown as part of the container (120A) may be a separate part of the proxy host (e.g., 106A) and/or the shared storage (e.g., 104).

The proxy hosts (e.g., 106A) utilize the number of connections (e.g., 130) and containers (e.g., 120A) (which in one or more embodiments of the invention are equal) that equals the recommended number of connections to use. In one or more embodiments of the invention, the containers (e.g., 120A) may transmit the slices to the backup storage (110) over the network (e.g., 108, FIG. 1A). In one or more embodiments of the invention, each container (e.g., 120A) may be able to support multiple connections (e.g., 130), however, the number of connections that may be supported by an individual container (e.g., 120A) depends on how the network (e.g., 108, FIG. 1A), backup storage (110), and shared storage (104) are configured. The number of connections may only limited by the number of streams each container (e.g., 120A) can read concurrently from each node (e.g., 104A-104N) and transmit to the backup storage (104).

Once the number of containers per node (e.g., 104A-104N) to be used for performing the backup is determined, preexisting containers (e.g., 120A) and connections (e.g., 130) may be assigned to receive and transmit the assets being backed up in the form of slices. In one or more alterative embodiments of the invention the containers may be created at the time the calculation is made, and they may exist only until the backup is complete.

The slices (122A-122N) are then transmitted through the network (e.g., 108, FIG. 1A) through the plurality of connections (e.g., 136A-136N). The slices may be temporarily stored in the proxy host (e.g., 106A) in a slice cache, memory, or other storage medium. Once the slices are formed, the backup agent (124) then transfers the slices to the backup storage (110) over the network (e.g., 108, FIG. 1A), and the slices are stored in the appropriate backup (e.g., 128A-128N).

The backup storage (110) may store one or more backups (128A-128N). The backups (e.g., 128A-128N) may be for different sets of assets that are located on the shared storage (e.g., 104) and/or on the production hosts (e.g., 100, FIG. 1A). One or more backups (e.g., 124A-124N) may store a backup of an entire shared storage (e.g., 104), or production host (e.g., 100, FIG. 1A), or may only store one or two assets such as a single database file, for example. The backups (e.g., 124A-124N) may store more or less data from different sources, and the invention is not limited to those described above. The backup storage (110) may comprise of more than one backup storage device that may be geographically distributed according to a data protection policy. Further backup storage (110) may take the form of local storage, tape storage, edge storage, cloud storage, or other forms of storage commonly used for storing backups.

Each backup includes both metadata and data (not shown) which, in one or more embodiments of the invention, is in the form of the slices transmitted form the nodes (e.g., 104A-104N) of the shared storage (e.g., 104) via the proxy host (e.g., 106A). The metadata (not shown) provides information such as mapping between slices and assets, number of connections/containers used to transmit the backup, the amount of time the backup took, and any other data that is useful for understanding the backup (e.g., 128A) as well as being able to restore one or more of the assets stored in the backup (e.g., 128A).

In one or more embodiments of the invention, each of the original and incremental backups (128A-128N) includes metadata (not shown) and data (not shown). In one or more embodiments of the invention the data from multiple backups (e.g., 128A-128N) may be stored together in the form of separate slices and/or have undergone deduplication. The backups (e.g., 128A-128N) may be stored in the form of original slices, in the form of data chunks, or in any other form. The backups (e.g., 128A-128N) may be stored in a plurality of backup containers (not shown) that are used during recovery to send the slices back in a chosen order.

In one or more embodiments of the invention, the shared storage (e.g., 104), proxy hosts (e.g., 106A), and backup storage (e.g., 110) are implemented as computing devices (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the shared storage (e.g., 104), proxy hosts (e.g., 106A) and backup storage (e.g., 110) described throughout this application.

In one or more embodiments of the invention, one or more of the shared storage (e.g., 104), proxy hosts (e.g., 106A) and backup storage (e.g., 110) are implemented as logical devices. The logical devices may utilize the computing resources of any number of computing devices and thereby provide the functionality of the shared storage (e.g., 104), proxy hosts (e.g., 106A) and backup storage (e.g., 110) described throughout this application. The invention is not limited to the structures described above with regards to FIG. 1B and other configurations may be used without departing form the scope of the invention.

Figure 2:
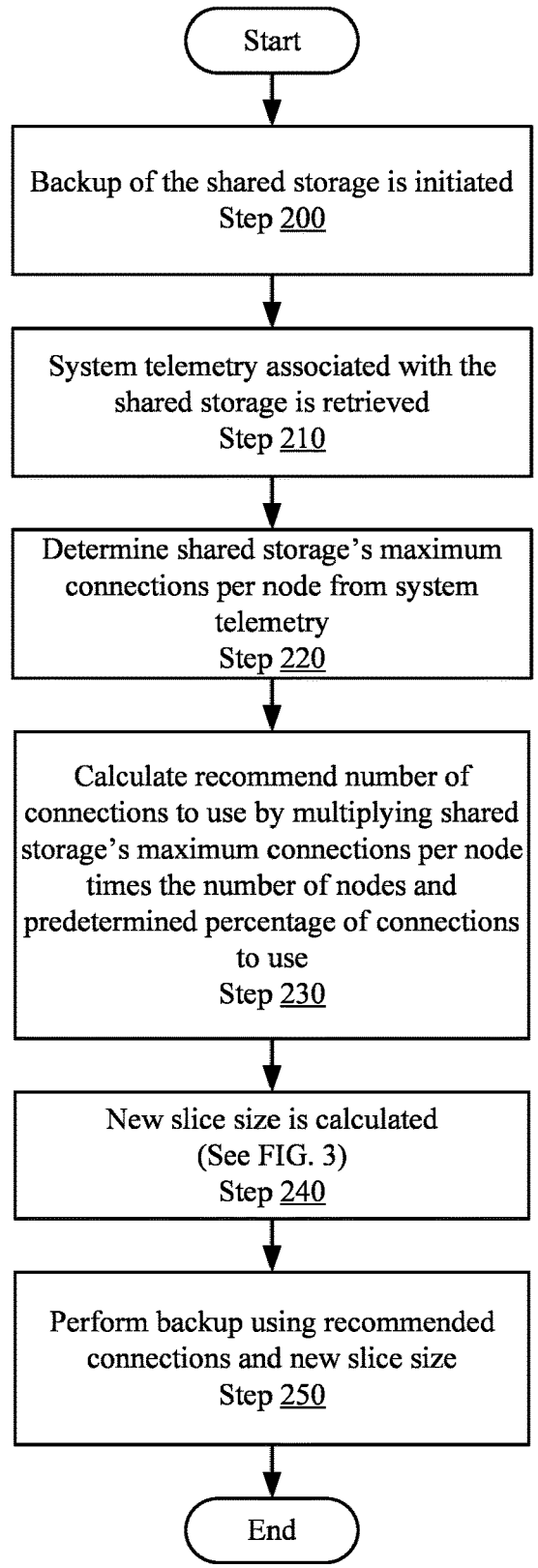
FIG. 2 shows a flowchart of a method of backing up a production host in accordance with one or more embodiments of the invention.

FIG. 2 shows a method of performing a backup of selected assets located on shared storage (e.g., 104, FIG. 1B), in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method of FIG. 2 may be performed by, for example, one or more proxy hosts (e.g., 106, FIG. 1A), the shared storage (e.g., 104, FIG. 1A) or an individual production host (e.g., 102A-102N, FIG. 1A). Other components of the system illustrated in FIGS. 1A and 1B may perform all or a portion of the method of FIG. 2 without departing from the invention.

In step 200, a backup of selected assets on the shared storage is initiated. The backup may be a first full backup or an incremental backup. The system receives a request triggering the backup. The request may be triggered by a user or administrator, or it may be triggered based on preconfigured instructions that indicate how often and/or when a proxy host or backup agent should perform a full backup and/or incremental backups. In one or more embodiments of the invention, the backup is an incremental backup, and the backup may be in the form of a full back up or partial backup. The request may include instructions for how to perform the backup (such as, but not limited to: a standard slice size, a predetermined tolerance, preset asset types, how many streams to use, tolerance for differences between each stream in cost and throughput, etc.) The request may also include an indication of a location to store the backup, which may include the backup storage device (e.g., 110, FIG. 1B) or other locations.

The shared storage may take the form of network attached storage (NAS) and may include one or more assets stored on it in the form of data (e.g., 114, FIG. 1B) or other well-known forms such as, but not limited, clusters, files, blocks, etc. The assets may be a file, a plurality of files, as well as folders, or other resources that are in general associated with the selected assets requested in the incremental or original backup request. The request may be for all the assets associated with a production host or may be for only a subset of the assets (such as, but not limited to, all database and user files). When the request for an asset is received, the proxy hosts (e.g., 106, FIG. 1A), another component such as a group manager (not shown), recommendation engine (e.g., 118, FIG. 1B), slicer (e.g. 116, FIG. 1B) or an appropriate production host (e.g., 102A-102N, FIG. 1A) determines the location of each asset utilizing file system metadata (not shown), storage metadata (not shown), and/or metadata from any previous backups (e.g., 128A-128N, FIG. 1B) performed on the assets stored in the shared storage (e.g., 104, FIG. 1B).

Once the request for the backup of the asset is received, the method proceeds to step 210, where system telemetry associated with the shared storage (e.g., 104, FIG. 1B) is retrieved. The system telemetry might include such things as the maximum number of connections available and/or maximum number that may be used per node, the number of available nodes, the number of connections currently being used for other processes etc. In one or more embodiments of the invention the shared storage's maximum connections per node is obtained in step 220 form the system telemetry obtained in step 210.

Once the shared storage's maximum connections per node is determined from the system telemetry in step 220, the method proceeds to step 230, where the recommended number of connections to use for performing the backup is calculated. This may be performed by the recommendation engine (e.g., 118, FIG. 1B) or other component of the system of FIGS. 1A and 1B.

The recommended number of connections, which in one or more embodiments of the invention is equal to the number of containers that is recommended to be used, is calculated by multiplying the maximum number of connections per node by the total number of nodes and a predetermined percentage of connections to use. The maximum number of connections per node and total number of nodes is determined as discussed above in steps 210 and 220 from current system telemetry for the shared storage (e.g., 104, FIG. 1B).

The predetermined percentage may be obtained from a user, administrator, or other concerned party and is an indication of the maximum percentage of resources that the user or other party wishes to be used for the purpose of performing a backup. When a user or administrator specifies the percentage, in accordance with one or more embodiments of the invention, the user may receive a prompt on a graphical user interface (GUI) to provide a percentage of resources that the backup may use. Alternatively, the percentage may be determined by analyzing system logs or one or more previous backups' metadata to determine, based on type of backup being performed, the size of the backup and/or when the backup is being performed, an ideal percent of system resources to be reserved for the use of performing the backup. Other mechanisms of obtaining the percentage may be used without departing from the invention including presenting the percentage at the time the system is initialized and/or manufactured to be 50%. Other percentages between 0 and 100% may be used without departing from the invention.

Other methods of calculating the recommended number of containers may be used without departing from the invention, and once the recommended number of connections to use is calculated in step 230, the method proceeds to step 240, where a new slice size is calculated to be used for performing the backup.

The new slice size is calculated in step 240. The new slice size is determined as described below in more detail with regards to the method shown in FIG. 3. The slice size is determined by comparing the number of active connections to the recommended maximum connections and increasing or decreasing the slice size of either the standard size slice or a size previously used based on that comparison. For example, if the previous slice size was 200 GB, then the new slice size might be 100 GB when the number of previous connections per node is less than a predetermined percent, such as, but not limited to, fifty percent of the current maximum number of connections per node. Other previous slice sizes, changes in slice size, and predetermined percentages may be used without departing form the invention.

Once the new slice size is calculated in step 240 and the recommended number of connections is calculated in step 230, the method proceeds to step 250. In step 250, the backup is performed using the recommended number of connections and the new slice size. The assets are obtained from one or more nodes (e.g., 104A-104N, FIG. 1B) of the shared storage (e.g., 104, FIG. 1B), sliced by a slicer (e.g., 116, FIG. 1B) or equivalent component, into a plurality of slices which are stored in a cache on the container (e.g., 120A, FIG. 1B) and then transmitted to the backup storage by the backup agent (e.g., 124, FIG. 1B).

In one or more embodiments of the invention the method ends after step 250. Once all the slices are transmitted to backup storage in step 250, the method of FIG. 2 may end.

Figure 3:
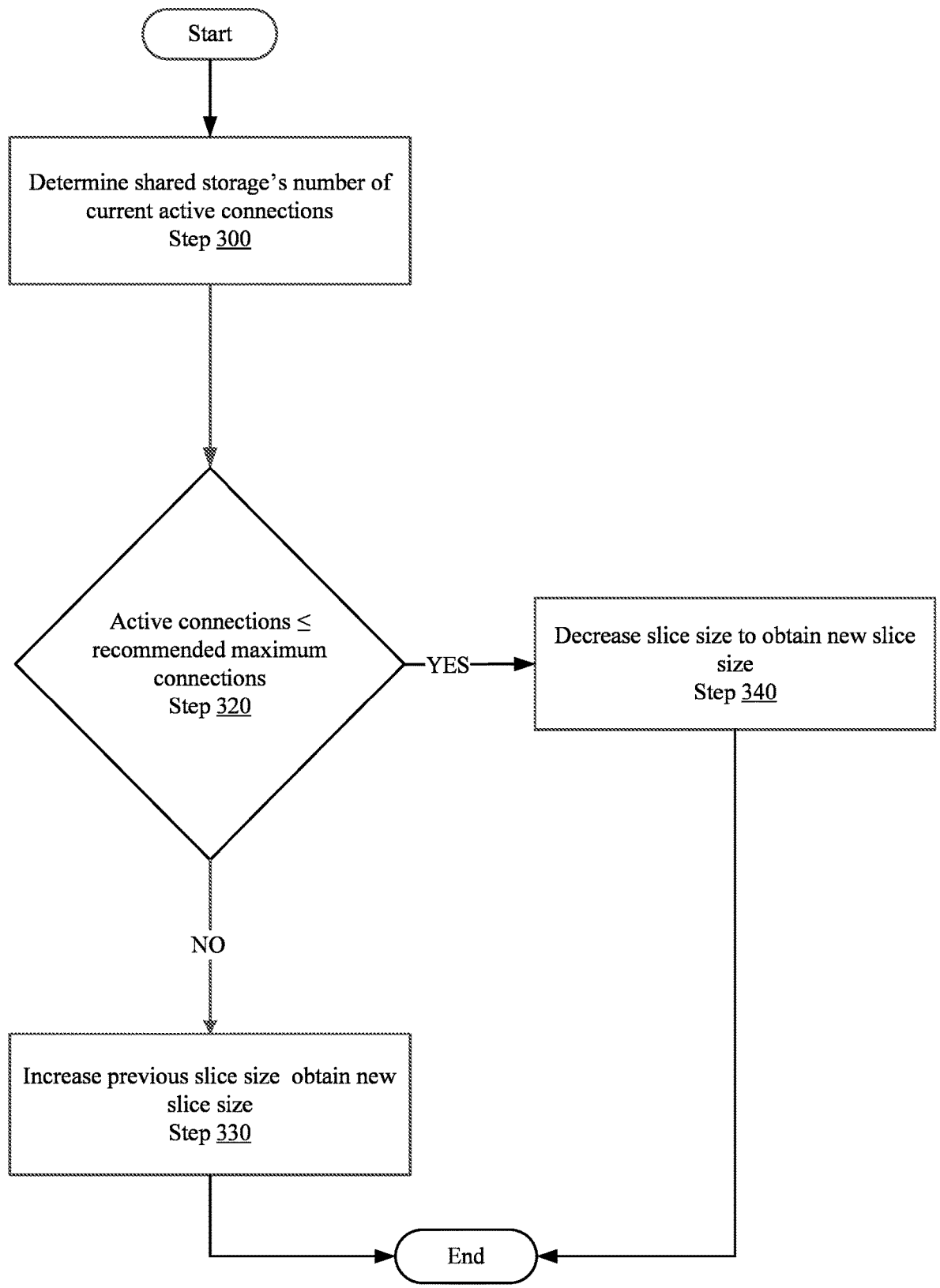
FIG. 3 shows a flowchart of a method of determining a slice size in accordance with one or more embodiments of the invention.

FIG. 3 shows a method of calculating a new slice size in accordance with one or more embodiments of the invention. While the various steps in the method are presented and described sequentially, those skilled in the art will appreciate that some or all the steps may be combined, omitted, executed in different orders, or some or all steps may be executed in a parallel manner without departing from the scope of the invention.

The method of FIG. 3 may be performed by, for example, a recommendation engine (e.g., 118, FIG. 1B), a slicer (e.g., 116, FIG. 1B), or other component of the proxy hosts (e.g., 106A, FIG. 1B), shared storage (e.g., 104, FIG. 1A) or an individual production host (e.g., 102A-102N, FIG. 1A). Other components of the system illustrated in FIGS. 1A and 1B may perform all, or a portion of the method of FIG. 3 without departing from the invention.

In step 300, the shared storage's (e.g., 104, FIG. 1B) number of current active connections are determined. This may be determined by analyzing other backups currently be performed, by using system telemetry associated with the shared storage or from other sources. Once the number of current active connections is determined the method proceeds to step 320.

In step 320 the number of active connections is compared to the recommended maximum connections that the shared storage can support. In one or more embodiments, this is a predetermined percentage of the total number of connections that the shared storage can establish. The predetermined percentage may be a value provided by a user or administrator when the backup is initialized, alternatively it may be a value that was provided when the shared storage was added to the system and/or the system was manufactured. In one or more embodiments, the percentage is 50%, however, a larger or smaller percentage may be used without departing from the invention.

Once the recommended maximum connections are determined, it is compared with the active connections in step 320, if the active connections are not less than or equal to the recommended maximum connections, the method proceeds to step 330. In step 330, the previous slice size, such as a standard size (which for example may be 200 GB), or the size used by the last backup successfully performed, is increased by a second predetermined percentage. As in step 320, this second predetermined percentage may be a value provided by a user or administrator when the backup is initialized, alternatively it may be a value that was provided when the shared storage was added to the system and/or the system was manufactured. In one or more embodiments the percentage is 50%, however, a larger or smaller percentage may be used without departing from the invention.

Returning to step 320, if however, it is determined that the number of active connections is less than the recommend maximum, the method proceeds to step 340, where the size of the slices is decreased by the second predetermined percentage. Once either step 330 or step 340 is completed the method of FIG. 3 ends.

Next, a non-limiting example of performing an incremental backup in accordance with the methods described above in FIGS. 2-3 is described.

EXAMPLE

In the following example an incremental backup is initiated for a selected assets comprising of a plurality of files and folders stored on a shared storage, which in one or more embodiments of the invention comprises of an NAS. The example is not intended to limit the scope of the invention.

When the new incremental backup is initiated, the telemetry for the shared storage is retrieved. It is determined from the current telemetry that the shared storage can support a maximum of 100 connections per node, with there being three nodes in the NAS (or NAS array). The telemetry also indicates that each connection can transport eight parallel streams and each connection is processed by a single container. The current system telemetry also finds that currently 45 connections are in use, using a standard slice size of 200 GB.

Once the incremental backup is initiated, the recommended number of connections to use (step 230 of the method of FIG. 2) for the incremental backup is determined using 25% as the predetermined percentage. The total maximum number of connections is calculated (100*3=300). The total recommend connections is then calculated by multiplying the predetermined percentage times the maximum number of connections (300), and the recommended number of connection 75 is obtained. Since eight parallel streams can be transported by each connection, the total number of recommended parallel streams is 600 (the total number of slices that can be moved at one time).

Next, in accordance with one or more embodiments of the invention, a new slice size is calculated. As discussed above, the total maximum number of connections is 300. In the present example, a user sets the predetermined percentage as 50% of the maximum connections. The number of active connections (45) is compared to 50% of the maximum connections (300*0.50) which is 150. Since the 45 active connections is less than 150, the slice size is decreased. Using 50% for the second predetermined percentage. The slice size is decreased to 100 GB (200−200*0.5).

Once the recommended number of connections and the new slice size are calculated, the incremental backup is performed with 600 parallel streams moving a plurality of slices that are 100 GB large. For example, if the selected asset is 500 TB, then 5000 slices that are 100 GB large are obtained using 600 parallel streams, via 75 connections. This compares to the unchanged size, which would be 2500 slices, moved across 240 parallel streams using 8 connections (assuming that the administrator set default number of connections per node in the NAS array. Thus, the one or more embodiments of the invention would result in better utilization of system resources and result in backup being performed faster. Said another way, without embodiments of the invention, the backup of 500 TB would use 8 connections versus 75 connections that would be used when embodiments of the invention are implemented. In this manner, embodiments of the invention enable the same amount of data is being transmitted more efficiently over a larger number of connection while only utilizing a portion of the total resources of the shared storage.

While the above-described example performs a backup of an assets that is in the hundreds of TB, the invention may be used with assets that are smaller or larger, with the one limitation being the total size of the shared storage that hosts the data. Further, while the example above uses 8 streams per container, a smaller number of parallel streams may be processed by the containers without departing from the invention.

Other combinations of assets, containers, parallel steams, initial slice sizes, and predetermined percentages may be used with the methods outlined above and with regards to the method of FIGS. 2 and 3. The above numbers are non-limiting and intended as an example only.

End Example

Additionally, as discussed above, embodiments of the invention may be implemented using computing devices. FIG. 4 shows a diagram of a computing device in accordance with one or more embodiments of the invention. The computing device (400) may include one or more computer processors (410), non-persistent storage (430) (e.g., volatile memory, such as random access memory (RAM), cache memory), persistent storage (440) (e.g., a hard disk, an optical drive such as a compact disk (CD) drive or digital versatile disk (DVD) drive, a flash memory, etc.), a communication interface (420) (e.g., Bluetooth interface, infrared interface, network interface, optical interface, etc.), input devices (460), output devices (450), and numerous other elements (not shown) and functionalities. Each of these components is described below.

In one embodiment of the invention, the computer processor(s) (410) may be an integrated circuit for processing instructions. For example, the computer processor(s) may be one or more cores or micro-cores of a processor. The computing device (400) may also include one or more input devices (460), such as a touchscreen, keyboard, mouse, microphone, touchpad, electronic pen, or any other type of input device. Further, the communication interface (420) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (450), such as a screen (e.g., a liquid crystal display (LCD), a plasma display, touchscreen, cathode ray tube (CRT), monitor, projector, or other display device), a printer, external storage, or any other output device. One or more of the output devices may be the same or different from the input device(s). The input and output device(s) may be locally or remotely connected to the computer processor(s) (410), non-persistent storage (430), and persistent storage (440). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices. In one or more embodiments, selected assets are backed up from shared storage such as a NAS array. In one or more embodiments, the assets are sliced into a plurality of slices, and the size of the slices is determined based on current usage of the system. At the same time, the number of connections/parallel streams used to transport the selected assets is determined also based on the current usage of the system and the maximum recommended number of connections that the shared storage may support. By changing the size of the slices and number of connections, one or more embodiments of the invention may ensure that the backup is performed as efficiently as possible. This may result in better utilization of system and network resources as well as a better backup and recovery performance.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for performing an incremental backup of a shared storage, the method comprising:
   initiating the incremental backup of the shared storage;
   retrieving current system telemetry associated with the shared storage;
   using the current system telemetry, determine a maximum number of connections per node the shared storage can support;
   calculating, using the maximum number of connections per node the shared storage can support, a recommended number of connections to use for performing the incremental backup;
   calculating, a new slice size, wherein a previous slice size is increased or decreased to produce the new slice size depending on a comparison between a number of active connections and the maximum number of connections per node; and
   performing the incremental backup of the shared storage using the recommended number of connections and the new slice size.

2. The method of claim 1, wherein calculating the recommended number of connections to use for performing the incremental backup comprises multiplying the maximum number of connections the shared storage can support by a predetermined percentage and a number of nodes of the shared storage that are currently available for performing the incremental backup.

3. The method of claim 2, wherein the predetermined percentage is provided by a user of one or more production hosts associated with the shared storage.

4. The method of claim 2, wherein the predetermined percentage is calculated based on a predicted usage of the shared storage while the incremental backup is being performed.

5. The method of claim 1, wherein the new slice size is calculated by decreasing a size of the previous slice size by a predetermined percentage when the number of active connections is less than or equal to a second predetermined percentage of the maximum number of connections per node the shared storage can support.

6. The method of claim 5, wherein both the predetermined percentage and the second predetermined percentage are 50%.

7. The method of claim 1, wherein the new slice size is calculated by increasing a size of the previous slice size by a predetermined percentage when the number of active connections is greater than a second predetermined percentage of the maximum number of connections per node the shared storage can support.

8. The method of claim 7, wherein both the predetermined percentage and the second predetermined percentage are 50%.

9. A non-transitory computer readable medium comprising computer readable program code, which when executed by a computer processor, enables the computer processor to perform a method for performing an incremental backup of a shared storage, the method comprising:
    initiating the incremental backup of the shared storage;
    retrieving current system telemetry associated with the shared storage;
    using the current system telemetry, determine a maximum number of connections per node the shared storage can support;
    calculating, using the maximum number of connections per node the shared storage can support, a recommended number of connections to use for performing the incremental backup;
    calculating, a new slice size, wherein a previous slice size is increased or decreased to produce the new slice size depending on a comparison between a number of active connections and the maximum number of connections per node; and
    performing the incremental backup of the shared storage using the recommended number of connections and the new slice size.

10. The non-transitory computer readable medium of claim 9, wherein calculating the recommended number of connections to use for performing the incremental backup comprises multiplying the maximum number of connections the shared storage can support by a predetermined percentage and a number of nodes of the shared storage that are currently available for performing the incremental backup.

11. The non-transitory computer readable medium of claim 10, wherein the predetermined percentage is provided by a user of one or more production hosts associated with the shared storage.

12. The non-transitory computer readable medium of claim 10, wherein the predetermined percentage is calculated based on a predicted usage of the shared storage while the incremental backup is being performed.

13. The non-transitory computer readable medium of claim 9, wherein the new slice size is calculated by decreasing a size of the previous slice size by a predetermined percentage when the number of active connections is less than or equal to a second predetermined percentage of the maximum number of connections per node the shared storage can support.

14. The non-transitory computer readable medium of claim 9, wherein the new slice size is calculated by increasing a size of the previous slice size by a predetermined percentage when the number of active connections is greater than a second predetermined percentage of the maximum number of connections per node the shared storage can support.

15. A system comprising:
    a processor; and
    a memory comprising instructions, which when executed by the processor, perform a method for performing an incremental backup of a shared storage, the method comprising:
        initiating the incremental backup of the shared storage;
        retrieving current system telemetry associated with the shared storage;
        using the current system telemetry, determine a maximum number of connections per node the shared storage can support;
        calculating, using the maximum number of connections per node the shared storage can support, a recommended number of connections to use for performing the incremental backup;
        calculating, a new slice size, wherein a previous slice size is increased or decreased to produce the new slice size depending on a comparison between a number of active connections and the maximum number of connections per node; and
        performing the incremental backup of the shared storage using the recommended number of connections and the new slice size.

16. The system of claim 15, wherein calculating the recommended number of connections to use for performing the incremental backup comprises multiplying the maximum number of connections the shared storage can support by a predetermined percentage and a number of nodes of the shared storage that are currently available for performing the incremental backup.

17. The system of claim 16, wherein the predetermined percentage is provided by a user of one or more production hosts associated with the shared storage.

18. The system of claim 16, wherein the predetermined percentage is calculated based on a predicted usage of the shared storage while the incremental backup is being performed.

19. The system of claim 15, wherein the new slice size is calculated by decreasing a size of the previous slice size by a predetermined percentage when the number of active connections is less than or equal to a second predetermined percentage of the maximum number of connections per node the shared storage can support.

20. The system of claim 15, wherein the new slice size is calculated by increasing a size of the previous slice size by a predetermined percentage when the number of active connections is greater than a second predetermined percentage of the maximum number of connections per node the shared storage can support.

* * * * *